United States Patent [19]
Walton

[11] Patent Number: 4,527,445
[45] Date of Patent: Jul. 9, 1985

[54] AUTOMATIC CONTROL SYSTEM HAVING MANUAL CONTROL ENGAGABLE AT WILL

[75] Inventor: Eric K. Walton, Columbus, Ohio

[73] Assignee: ACR Process Corp., Champaign, Ill.

[21] Appl. No.: 604,194

[22] Filed: Apr. 23, 1984

[51] Int. Cl.³ ............... F16H 27/02; F16H 29/02
[52] U.S. Cl. .................. 74/625; 74/89.22; 251/130
[58] Field of Search ............ 74/625, 665 A, 665 B, 74/665 D, 665 E, 89.22, 202, 203, 206, 424.8 VA; 251/130, 25

[56] References Cited

U.S. PATENT DOCUMENTS

| | | | |
|---|---|---|---|
| 783,007 | 2/1905 | Allen et al. | 251/130 |
| 1,662,134 | 3/1928 | Smith | 251/130 |
| 2,468,490 | 4/1949 | Joseph | 74/625 X |
| 2,623,618 | 12/1952 | Howard | 192/48 |
| 2,698,157 | 12/1954 | Ludeman | 251/14 |
| 2,979,966 | 4/1961 | Martens | 74/424.8 |
| 3,315,250 | 4/1967 | Higgins | 340/347 |
| 3,385,310 | 5/1968 | Randall | 137/85 |
| 3,842,690 | 10/1974 | Gulick | 74/625 |
| 3,845,788 | 11/1974 | Laven | 251/130 X |
| 4,054,155 | 10/1977 | Hill | 251/25 X |
| 4,247,077 | 1/1981 | Banick et al. | 251/25 |
| 4,438,662 | 3/1984 | Walton et al. | 74/625 |

FOREIGN PATENT DOCUMENTS

| | | | |
|---|---|---|---|
| 13835 | 11/1880 | Fed. Rep. of Germany | 74/625 |
| 1142557 | 2/1969 | United Kingdom | 251/130 |

Primary Examiner—George H. Krizmanich
Assistant Examiner—Dirk Wright
Attorney, Agent, or Firm—John L. Gray

[57] ABSTRACT

A device for varying fluid pressure in increments in order to vary the position of a mechanism in a remote location such as a valve wherein the output pressure of the fluid may be controlled through an automatic system which may be manually overridden without disengaging the automatic control system.

6 Claims, 1 Drawing Figure

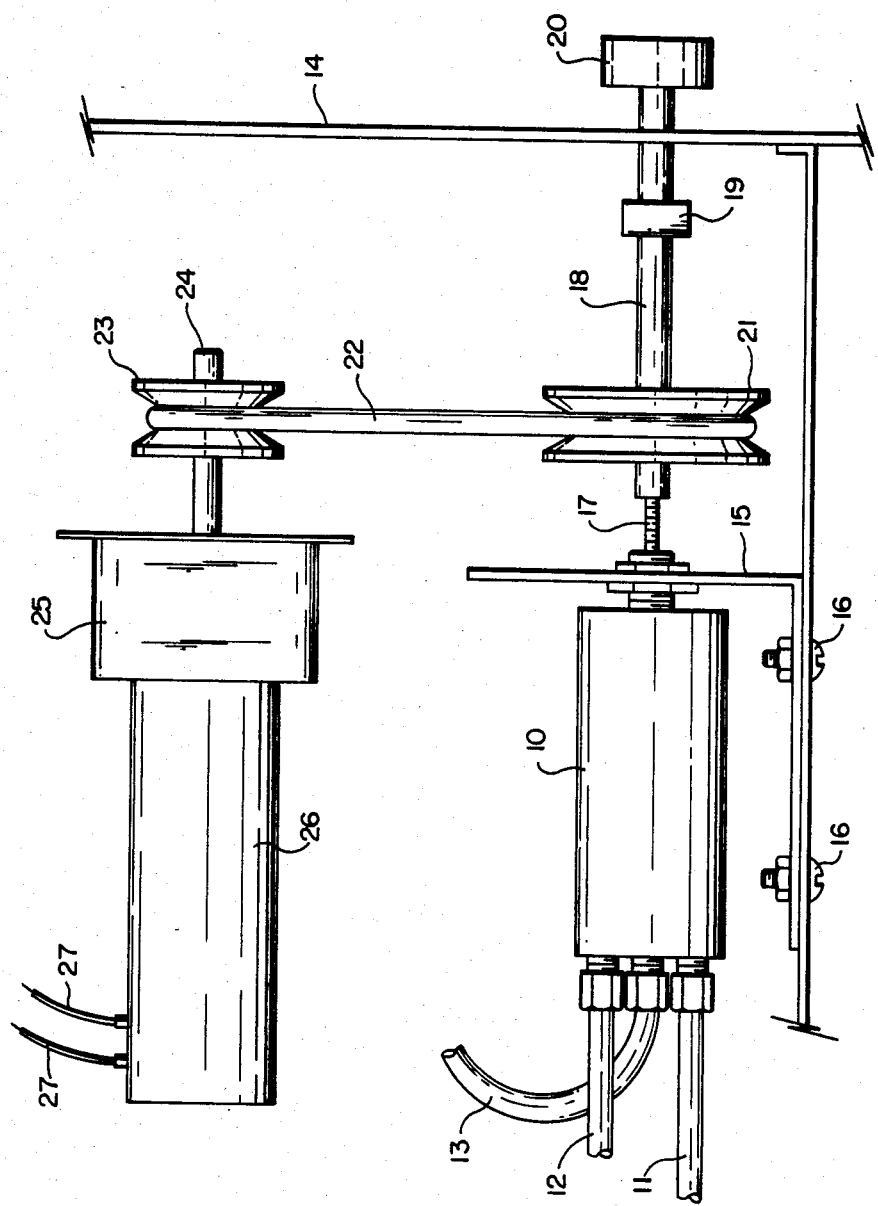

AUTOMATIC CONTROL SYSTEM HAVING MANUAL CONTROL ENGAGABLE AT WILL

BACKGROUND OF THE INVENTION

Various industrial processes involving automatic control have such control activated from a remote location. For example, it is convenient in many industrial applications to have the control centered at a control center where an operator can monitor information with respect to the industrial process and even though the control system is automatically operated, the operator has the option to shift over to manual control if the situation is warranted.

A variety of energy sources are used to operate the ultimate component being controlled. These can be pneumatic, hydraulic, or electrical and a variety of components can be controlled such as valves, electrical resistance, etc. While there is a broad range of industrial application which may be controlled, for illustration purposes herein the manual control option, which is the subject matter of this invention, will be described in connection with a pneumatic pressure regulator which in turn adjusts a pressure operated valve. Such systems are particularly useful in the chemical industry because of their reliability, economy, ruggedness, and safety.

SUMMARY OF THE INVENTION

For illustration purposes only, the invention will be described in connection with the modulation of a valve which is operated as a result of changes in pressure controlled by a pressure regulator which is operated by the automatic control system involved. The manual override of this invention may be actuated at any time and does not require that there be a failure of the automatic control system, such as a failure of the electrical system which automatically controls the pressure regulator.

Furthermore, in the system herein described, it is not necessary for the automatic aspects of the system to be disengaged, either manually or automatically, in order for the operator to seize manual control of the system. Devices of the prior art that are deemed to be most pertinent to this invention are U.S. Pat. No. 3,842,690, Gulick, and U.S. Pat. No. 2,698,157, Ludeman. In each of these patents, however, in order for manual operation to occur, the system must cease to function automatically causing an automatic change over to permit manual operation of the control system.

Furthermore, in the preferred embodiment of this invention, the pressure regulator setting is altered in incremental amounts so that there is a very low probability of a large output variation due to erroneous signals. The reason for this is because only a small output change occurs with each input triggered command.

It is, therefore, an object of this invention to provide a control system which may be manually operable without disengaging the automatic features of the control system.

It is a further object of this invention to provide such a system which is economical, reliable and simple to construct.

It is a still further object of this invention to provide such a system wherein the instructions to the element being controlled are provided in incremental commands.

These, together with other objectives and advantages of the invention, should become apparent in the details of construction and operation, as more fully described herein and claimed, reference being had to the accompanying drawing forming a part hereof wherein like numerals refer to like parts throughout.

BRIEF DESCRIPTION OF THE DRAWING

The FIGURE is a side elevation view of the pressure control system showing the manual override.

DETAILED DESCRIPTION OF THE INVENTION

Referring to the drawing, 10 is a screw-type pressure regulator which has an input hose 11 connected to an air supply, usually from 50 to 100 psi, and an output hose 12 which goes to the valve which is being controlled, the output usually varying from 0 to 15 psi. A third hose 13 leads to a gauge located on the instrument panel 14 which can be viewed by the operator. The pressure regulator 10 is fixedly fastened to framework 15 by means of bolts 16—16. The screw 17 of the pressure regulator is connected to a shaft 18. A collar 19 surrounds the shaft 18 and a handle 20 is provided at the end of the shaft. The shaft has fixedly positioned thereon a driven pulley 21 which is driven by a drive belt 22, preferably made of rubber. The driving pulley 23 is positioned on shaft 24 which, through a gearbox 25, is connected to a reversible DC motor 26 which is connected by means of the two leads 27—27 to a pulser (not shown). This permits incremental rotation of the DC motor and provides a low probability of large output variations due to erroneous signals.

In operation, the automatic controlling device, which is usually a computer, will actuate the pulser to cause the DC motor 26 to rotate, the direction of rotation being reversible by changing the polarity of the voltage to the motor. The motor 26 will drive, through the gearbox 25, the driving pulley 23 which in turn rotates the driven pulley 21, thus rotating screw 17 and adjusting the pressure in the pressure regulator so as to modify the pressure in hose 12 and thus modify the position of the valve which is being controlled. There is sufficient elasticity in the drivebelt so that as the driven pulley 21 advances toward the pressure regulator 10 or moves away from the pressure regulator 10 it will continue to be driven by the drivebelt. The collar 19 acts as a stop to prevent the driven pulley 21 from moving the screw 17 too far out of the pressure regulator 10.

In the event that the operator wishes manually to override the control system at any time and without the necessity of disengaging any device, the handle 21 may be rotated, overcoming the friction of the rubber drivebelt 22 with the driven pulley 21 and thus permitting manual adjustment of the pressure regulator 10.

Thus it will be seen that the automatic system can be overridden at any time through manual control and in the event of a failure of the automatic system, manual control can be instantaneously exercised without the necessity of any sort of automatic disengagement being involved.

While this invention has been described in its preferred embodiment, it is appreciated that variations thereon may be made without departing from the scope and spirit of the invention.

What is claimed is:

1. A device for varying fluid pressure in increments to remotely position a mechanism, comprising
a source of fluid under pressure, said fluid under pressure connected to the input of said device, means for controlling the output pressure of fluid from said device to said remotely located mechanism in increments, means for automatically directing the exercise of said control, a coupling means which is frictionally operated positioned between said means for automatically directing the exercise of control and means for controlling the output pressure of said fluid, and a manually operated means which is capable of overcoming the friction forces of said frictionally operated coupling means and capable of directing the exercise of said control without disengaging said automatic means.

2. The device of claim 1 wherein said coupling means includes a pulley and a belt driving said pulley.

3. The device of claim 1 wherein said source of fluid under pressure is compressed air.

4. The device of claim 1 wherein said automatic means for directing the exercise of said control includes a reversible motor.

5. The device of claim 2 wherein said pulley is driven through a drivebelt attached to a pulley driven by a reversible electric motor.

6. The device of claim 1 wherein said automatic means for directing the exercise of said control only directs the exercise of said control in incremental steps.

* * * * *